United States Patent [19]

Harada et al.

[11] 4,118,354

[45] Oct. 3, 1978

[54] POLYURETHANE HYDROGEL AND METHOD FOR THE PRODUCTION OF THE SAME

[75] Inventors: Hideo Harada, Nagaokakyo; Nobuaki Matsushita, Kyoto, both of Japan

[73] Assignee: Dai-Ichi Kogyo Seiyaku Co., Ltd., Kyoto, Japan

[21] Appl. No.: 715,056

[22] Filed: Aug. 17, 1976

Related U.S. Application Data

[63] Continuation of Ser. No. 418,181, Nov. 23, 1973, abandoned.

[30] Foreign Application Priority Data

Nov. 24, 1972 [JP] Japan .................................. 47-118321

[51] Int. Cl.$^2$ ..................... B01D 53/02; C08G 18/32; C08J 3/06
[52] U.S. Cl. ................................ 260/29.2 TN; 210/54
[58] Field of Search ................ 260/29.2 TN, 77.5 AP

[56] References Cited

U.S. PATENT DOCUMENTS

| | | |
|---|---|---|
| 2,726,219 | 12/1955 | Hill .................. 260/29.2 TN |
| 2,948,691 | 8/1960 | Windemuth et al. ........ 260/29.2 TN |
| 3,181,612 | 5/1965 | West ............................. 260/29.2 TN |
| 3,847,722 | 11/1974 | Kistner .......................... 260/29.2 TN |
| 3,894,131 | 7/1975 | Steech ........................... 260/29.2 TN |

*Primary Examiner*—Murray Tillman
*Assistant Examiner*—A. H. Koeckert
*Attorney, Agent, or Firm*—Armstrong, Nikaido, Marmelstein & Kubovcik

[57] ABSTRACT

The improved polyurethane hydrogel is produced by dispersing a reaction product obtained by the reaction of a polyisocyanate having at least two isocyanate groups with a polyether. The polyether comprises a plurality of alkylene oxides, 50 to 90% by weight of which is ethylene oxide, added at random to a polyalcohol having at least two terminal hydroxyl groups in an amount of an average molecular weight within the range of 1,000 to 4,000 per said hydroxyl terminal group of said polyalcohol. The improved polyurethane hydrogel can have a greater water content and is highly stable and highly elastic.

20 Claims, No Drawings

POLYURETHANE HYDROGEL AND METHOD FOR THE PRODUCTION OF THE SAME

This is a continuation of application Ser. No. 418,181 filed Nov. 23, 1973, now abandoned.

BACKGROUND OF THE INVENTION

This invention relates to improved polyurethane hydrogels and a method for the production thereof. More particularly, this invention relates to highly stable and highly elastic polyurethane hydrogels having a greater water content and a method for the production of the same.

In the production of polyurethane hydrogels, it is known to utilize polyethylene glycol having a molecular weight within the range of 1,000 to 20,000, as disclosed in Japanese Patent Publication No. 25,988 of 1971. It is also known to utilize for the production of polyurethane hydrogels, polyglycol ethers such as stearyl alcohol, ethylene glycol, trimethylolpropane and pentaerythritol, as disclosed in U.S. Pat. No. 2,948,691. In these known arts, polyethylene glycol or polyglycol ether is reacted with a polyisocyanate and the reaction product is then reacted with an excess amount of water to form a polyurethane hydrogel. However, the production of polyurethane hydrogels utilizing the above-mentioned known materials involves many disadvantages and cannot be successfully put into practice on an industrial scale. For example, in any of the cases where polyethylene glycol of a molecular weight of 4,000 is used and where ethylene glycol ether of polymethylolpropane having a molecular weight of 4030 is used, the polyurethane hydrogel obtained by mixing the reaction product with an excess amount of water is inferior in hardness and unstable. Particularly, if the water content of the hydrogel is over 95% by weight, the gelation cannot be carried out homogeneously and the product hydrogel tends to decompose to separate water from the gel. One of the reasons why the prior arts can only produce soft and unstable gel is the fact that polyethylene glycol or ethylene glycol ether is singly used. If polyethylene glycol is singly used, the greater the length of polyethylene glycol chain, the higher the solidifying point of polyethylene glycol. For example, with the molecular weight of polyethylene glycol per hydroxyl group being 1,000 or more, polyethylene glycol will be solidified even at room temperature. As a result thereof, the prepolymer obtained by the reaction between such polyethylene glycol and a polyisocyanate usually has a higher solidifying point and it will be easily solidified in winter. Accordingly, in order to use such the prepolymer having a higher solidifying point to form polyurethane hydrogel upon the reaction with water, it is necessary to take some preparatory steps. For example, the prepolymer must be liquefied by heating or it must be diluted with a suitable solvent to lower its solidifying point. In case of using a solvent for lowering the solidifying point of the prepolymer, another problems will arise. For example, if an inflammable solvent is used, care must be taken in handling the prepolymer to prevent it from catching fire. In addition, most of solvents pose problems in terms of poisoning and environmental pollution. Furthermore, in some cases addition of solvents causes decomposition of the hydrogel, reduction of the gel hardness and shrinkage of the hydrogel.

The primary object of the invention is to provide an improved polyurethane hydrogel in which the above mentioned disadvantages with conventional techniques can be avoided.

Another object of the invention is to provide an improved polyurethane hydrogel having a greater water content.

A further object of the invention is to provide an improved polyurethane hydrogel which is highly stable and highly elastic.

A still further object of the invention is to provide a prepolymer which is capable of forming a stable polyurethane hydrogel upon the reaction even with a corrosive electrolyte solution.

One of the other objects of the invention is to provide a prepolymer which is capable of forming a stable polyurethane hydrogel upon the reaction with an aqueous solution or dispersion containing detrimental and poisoning substances to entrap them therewith for the purpose of avoiding environmental pollution.

The other objects and advantages of the invention will become apparent from the following detailed description of the invention.

SUMMARY OF THE INVENTION

According to the invention the improved polyurethane hydrogel is produced by dispersing a reaction product obtained by the reaction of a polyisocyanate having at least two isocyanate groups with a polyether into an aqueous liquid phase to form a hydrogel. The polyether which is to be reacted with the polyisocyanate comprises a plurality of alkylene oxides, 50 to 90% by weight of which is ethylene oxide, added to random to a polyalcohol having at least two terminal hydroxyl groups in an amount of an average molecular weight within the range of 1,000 to 4,000 per said hydroxyl terminal group of said polyalcohol. Preferably, 75 to 85% by weight of said alkylene oxides contained in the polyether is ethylene oxide.

In a preferred embodiment of the invention, the polyether which is to be reacted with a polyisocyanate comprises a plurality of alkylene oxides 50 to 90% by weight of which is ethylene oxide, added at random to a polyalcohol having three terminal hydroxyl groups in an amount of an average molecular weight within the range of 2,000 to 3,000 per terminal hydroxyl group of the polyalcohol.

More preferably, the polyether which is to be reacted with a polyisocyanate comprises ethylene oxide and propylene oxide added at random to glycerine in an amount of an average molecular rate within the range of 2,000 to 3,000 per terminal hydroxyl group of glycerine, said ethylene oxide and propylene oxide being contained in said polyether at the ratio within the range of 75:25 to 85:15 by weight, respectively.

The aqueous liquid phase which is used for the formation of a polyurethane hydrogel according to the invention may be any of water, an aqueous solution and an aqueous dispersion. Corrosive electrolyte solutions may also be included as well.

DETAILED DESCRIPTION OF THE INVENTION

The starting materials for the polyether which is to be reacted with a polyisocyanate is a polyalcohol having at least two terminal hydroxyl groups. Among the polyalcohols which may be used there are included ethylene glycol, propylene glycol, glycerine, trimethylolpropane, 1,2,6-hexanetriol, pentaerythritol, sorbitol, sucrose, α-methylglycoside.

To the above mentioned polyalcohol a plurality of alkylene oxides are added at random, not in a block form, to produce a polyether as one of the reactants for carrying out the reaction according to the invention. Among the alkylene oxides to be added to the starting material polyalcohol there may be included ethylene oxide, propylene oxide, butylene oxide and stylene oxide. The addition reacton, per se, may be carried out by any conventional methods. One of the alkylene oxides to be added is ethylene oxide. The ratio of ethylene oxide with any other alkylene oxide or oxides should be within the range of 50:50 to 90:10 by weight.

The polyalkylene oxides should be added to the starting material polyalcohol in such an amount as a molecular weight within the range of 1,000 to 4,000 per terminal hydroxyl group of the polyalcohol. With the molecular weight being less than 1,000, the obtained isocyanate condensate will be highly hydrophobic and not well dispersed into water. This will then result in non-uniform partial gelation. On the other hand, with the molecular weight being above 4,000 the obtained isocyanate condensate will have a high pour point and a high viscosity and accordingly be of no practical use.

The other reactant for the reaction according to the invention is a polyisocyanate having at least two isocyanate groups. Among the useful polyisocyanates there may be mentioned tolylene-diisocyanate, naphthalene-diisocyanate, xylene-diisocyanate and the like. Two or more of these compounds may be used in combination.

The reaction between the polyether and a polyisocyanate may be carried out by any conventional method.

By way of example of the invention, ethylene glycol is subjected, after 0.8% by weight of potassium hydroxide has been added thereto, to the reaction with a mixture of 80 parts by weight of ethylene oxide and 20 parts by weight of propylene oxide at a temperature between 100° and 130° C and under a nitrogen atmosphere of 1 to 4kg/cm$^2$G for 4 to 5 hours. 3% of synthetic aluminum silicate is added to the obtained reaction product for a neutralization treatment under reduced pressure for approximately 1 hour and thereaftr it is fitted by a suitable filtering apparatus to get clear polyalkylene glycol random polymer of high purity. The random polymer thus obtained contains less than 10 ppm of heavy metals and less than 0.5% of moisture.

The refined polyalkylene glycol random polymer is heated up to a temperature between 80° and 120° C. To this an excess amount of TDI-80 (tolylene-diisocyanate) is added with stirring for about two hours to obtain a polyurethane prepolymer as the reaction product after cooling.

The reaction product thus obtained is then dispersed into an aqueous liquid phase to form a polyurethane hydrogel without aid of any gelatinizer. The aqueous liquid phase may be any of pure water, aqueous solutions and aqueous dispersions. Among aqueous solutions there may be included various electrolyte solutions and various aqueous solutions dissolving organic compounds therein. The reaction product according to the invention is capable of forming a polyurethane hydrogel upon the reaction even with any of a corrosive aqueous solutions including solutions of salts such as brine, sea water, sodium carbonate, phosphates and oxalates, phthalates; solutions of strong acids such as sulfuric acid and formic acid; and solutions of strong bases such as sodium hydroxide and calcium hydroxide.

The reaction product according to the invention is also useful to gelate any aqueous dispersions including varioud suspended particles. Among the aqueous dispersions there may be included sewage and industrial waste water containing sludge.

Other uses of the reaction products according to the invention will be partly self explanatory and partly become apparent from the following description.

In an preferred embodiment of the invention, the polyether which is to be reacted with a polyisocyanate comprises a plurality of alkylene oxides, 50 to 90% by weight of which is ethylene oxide, added at random to a polyalcohol having three terminal hydroxyl groups in an amount of an average molecular weight within the range of 2,000 to 3,000 per each terminal hydroxyl group of the polyalcohol. The reaction product obtained by the reaction of this particular polyether with a polyisocyanate having at least two isocyanate groups have the following outstanding advantages:

(1) It has a low viscosity which renders it easy to handle in practical usage even in winter season. This is particularly advantageous when intended to use it as sealing or plugging agents for sealing porous or permeable underground formations under low temperature conditions in winter.

(2) It is capable of forming an uniform polyurethane hydrogel upon contact with warm water.

(3) It is capable of forming a polyurethane hydrogel which contains more than 95% of water and yet is uniform and stable. Also it can gelate even an electrolyte solution, thus making it possible to use it for sealing sea water and fixing marine soil in various maritime development projects.

It is important to the invention that the alkylene oxides are added at random to the starting material polyalcohol. The random polymers according to the invention are particularly advantageous in comparison with the block polymers by the following aspects:

(1) The resulted isocyanate condensates have a relatively low pour point or solidifying point and a low visocsity, thus for making it easy to handle them in actual usage. For example, they are not solidified even under low temperature conditions in winter.

(2) The isocyanate condensates are extremely stable in storage and show no appreciable increase in the viscosity even after a long period of storage.

(3) The isocyanate condensates can be readily dispersed and emulsified in water. In particular, they are thoroughly dispersed in water without stirring to form a uniform hydrogel.

(4) The isocyanate condensates are capable of forming a hydrogel which contains more than 95% by weight of water and yet is uniform and stable. Water is by no means separated therefrom. When polyglycol having more than three functional groups is used as starting material, the reaction products can form a uniform hydrogel within warm water.

Polyalcohols having four or more functional hydroxyl groups are also useful as starting materials for the polyethers which are to be reacted with polyisocyanates according to the invention. However, in those cases, the obtained polyurethane hydrogel is not always of practical use, regardless of the molecular weight of the alkylene oxides added to the starting material, because uniform gelation cannot be expected and it is extremely difficult to control gelation due to a higher gelation speed.

According to this invention, when the polyurethane prepolymer is put into water or an electrolyte solution, the polyurethane prepolymer is emulsified within water or solution and in several minutes the polyurethane emulsion congels into a uniform polyurethane hydrogel. At this stage, cross-linking reaction takes place between polyurethane and water. The amount of water to be added depends on the type of resin to be employed. In general, more than 70% by weight of water may be added. However, it is preferable to add 85 to 90% by weight of water.

According to this invention, a cross-linking reaction proceeds itself between one part of polyurethane resin and water without addition of any reaction promotor. However, when desired, base of acid materials such as tertiary amine and formic acid may be used to control the speed of the cross-linking reaction. In addition, suitable coloring agents, organic and inorganic fillers, solvents and diluents may optionally be employed.

In this manner, a polyurethane hydrogel which contains more than 95% of water and yet is uniform, elastic and stable was formed without causing decomposition of the gel.

Water contained in the hydrogel is not separated therefrom even after the hydrogel is kept to lapse in a sealed condition for one year. This manifests itself that the polyurethane hydrogel formed according to this invention is extremely stable in storage.

These properties are peculiar to the compounds of this invention and are effective to expand applications in which they are to be used. Also, the fact that a large mass of hydrogel is produced with a minimum quantity of polyurethane resin promotes the use of rather expensive polyurethane resin in various applications where the use of polyurethane resin has hitherto been avoided for economical reasons. For example, the polyurethane hydrogels of this invention may successfully be utilized in disposing of various sludges of the bottom of rivers, seas, sludges removed out from organic and inorganic waste liquids and sewage. The polyurethane hydrogels are also employed in disposing of liquid wastes released from breweries, papermills, dye works, tanneries, slaughter houses and etc. Further, aqueous solutions containing noxious metals and radioactive substances are effectively confined within the polyurethane hydrogel to prevent them from being scattered.

PREFERRED EMBODIMENTS OF THE INVENTION

Polyurethane prepolymers listed in Table 1 were added to various aqueous liquid phases such as water, sea water, aqueous electrolyte solutions and aqueous sludges with stirring to observe the formation of hydrogels and their properties. Prepolymers were prepared and hydrogels were formed as follows:

(1) Preparing Polyurethane Prepolymers

Each of various polyethers is introduced into a flask equipped with an agitator and a thermometer. After replacing air in the flask with $N_2$, the flask was heated up to an elevated temperature of 120° ± 5° C. At this temperature, polyisocyanates were dropped into the flask taking for about 20 minutes after which the content of the flask was agitated for 1-2 hours at the same temperature to complete the desired reaction. The reaction product(prepolymer) thus obtained was cooled down to the temperature of 40° C with water and contained in a plastic receptacle. The receptacle containing the prepolymer was kept in a desiccator at room temperature. Properties of prepolymers prepared as above are listed in Table 1. For comparison purposes, some prepolymers which were made using block polymers as polyethers are also given in Table 1.

(2) Forming Polyurethane Hydrogels

Prepolymers which have been produced in the manner described above were introduced into beakers containing water, sea water and an electrolyte contained aqueous solution, respectively, while stirring by glass rods. The beakers were kept substantially at a fixed temperature. The state each of the hydrogels was observed by finger touching. It was also ascertained whether or not water is separated. Gel hardness was measured using the Testing Apparatus for Cone Penetration of Petrolatums and Greases according to JIS-K-2809.

(i) Properties of polyurethane hydrogels formed utilizing water as the aqueous liquid phase are shown in Table 2.

(ii) Properties of polyurethane hydrogels formed utilizing sea water as the aqueous liquid phase are shown in Table 3. The sea water used includes the following components therein:

| | |
|---|---|
| NaCl | 2.7% by weight |
| $MgCl_2$ | 0.38% by weight |
| $MgSO_4$ | 0.17% by weight |
| $CaSO_4$ | 0.13% by weight |
| $K_2SO_4$, $CaCO_3$, $MgBr_2$ | 0.11% by weight |

(iii) Properties of polyurethane hydrogels formed utilizing various electrolyte solutions are shown in Table 4. The electrolyte solutions were prepared in the following manners, respectively:

(a) Standard aqueous solution containing sodium carbonates
  2.10g of $NaHCO_3$ and 2.65g of $Na_2CO_3$ were dissolved in pure water to prepare 1l of an aqueous solution of carbonates. The pH of the solution was adjusted at 10.07 at 20° C.

(b) Standard aqueous solution containing neutral phosphates.
  3.40g of $KH_2PO_4$ and 3.55g of $Na_2HPO_4$ were dissolved in pure water to form 1l of an aqueous solution of phosphates. The pH of the solution was adjusted at 0.88 at 20° C.

(c) Standard aqueous phthalate solution
  10.21g of $C_6H_4COOKCOOH$ was dissolved in water to form 1l of an aqueous solution. The pH of the solution was adjusted at 4.00 at 20° C.

(d) Standard aqueous oxalate solution
  12.71g of $KH_3(C_2O_4)_2 \cdot 2H_2O$ was dissolved in pure water to form 1l of an aqueous solution.
  The pH of the solution was adjusted at 1.68 at 20° C.

(3) Chemical Resistance Tests

Polyurethane hydrogels of the invention were tested in their resistance to various chemicals by dipping the hydrogels in aqueous solutions thereof.
Polyurethane hydrogels tested are:

(A) A polyurethane hydrogel formed by dispersing 20% by weight of the prepolymer of Sample No. 1 in Table 1 in 80% by weight of tap water.
(B) A polyurethane hydrogel formed by dispersing 20% by weight of prepolymer of Sample No. 13 in Table 1 in 80% by weight of tap water.

Aqueous solutions employed:

An aqueous solution of $H_2SO_4$(pH 1.0)
An aqueous solution of $Na_2SO_4$(pH 7.0)
An aqueous solution of $Ca(OH)_2$(pH 11.0)
An aqueous solution of NaOH(pH 13.0)

Test results are shown in Table 5. As is apparent from Table 5, polyurethane hydrogels of the invention were substantially stable even in aqueous solutions of highly corrosive chemical substances. It will be understood that aqueous solutions of corrosive chemicals may suitably be employed as aqueous liquid phase to form hydrogels according to this invention.

(4) Polyurethane Hydrogen formation With Pulp Sludge

10 Parts by weight of a solution comprising 5% of the prepolymer Sample No. 13 in Table 1 was added to 100 parts by weight of pulp sludge released from paper mills and containing 65% of water with stirring. The mixture was put still to turn into a hydrogel elastomer in about 10 minutes. The hydrogel elastomer contained 60% by weight of water and has a Shore-A hardness of 15. The hydrogel elastomer was kept in a rapid flow of water. No decomposition occurred. The hydrogel has no offensive smell.

(5) Treatment of Sewage

Sewage was treated according to the activated sludge process. The precipitate formed at the bottom of the secondary airation tank contained solid components of 1.2% by weight and had a pH of 6.9. 500 ppm of 38% formaldehyde solution was added to the precipitate with stirring. Further, 20 ppm of polyvinylpyridinium chloride cation solidifier was added to the precipitate to obtain a body of the precipitate having a water content of 74%. 5 parts by weight of a solution comprising 50% by weight of methylethylketone and 50% by weight of the prepolymer Sample No. 1 of Table 1 was added to 100 parts by weight of the precipitate. In approximately 10 minutes, a hydrogel was formed. The hydrogel had an initial water content of 65%. After the hydrogel was put still for three weeks, it was dried and shrinked without causing decomposition and the water content was reduced to 20%.

Table 1

| | Preparation of Prepolymers | | | | | | | | | |
|---|---|---|---|---|---|---|---|---|---|---|
| | Properties of Polyethers | | | | | | | | | |
| | Starting materials | | Added alkylene oxide | | | | Type of poly-meriza-tion | Isocya-nates | Ratio of polyether/ polyisocya-nate by weight | Prepolymers | |
| Sample No. | Poly-alcohols | OH groups | Ethylene oxide (wt. %) | Other alkylene oxide | Avg. Mol. wt. in total | Avg. Mol. wt. per —OH | | | | Appearance | Solid-ifying point (° C) |
| 1 | Ethylene glycol | 2 | 80 | 20(P) | 4000 | 2000 | Random | TDI-80 | 100/25 | Viscous liquid | 6 |
| 2 | " | " | " | " | " | " | " | " | " | " | " |
| 3 | " | " | " | " | " | " | " | " | " | " | " |
| 4 | " | " | 50 | 50(P) | " | " | " | " | 100/30 | " | 3 |
| 5 | " | " | " | " | " | " | " | " | " | " | " |
| 6 | " | " | " | " | " | " | " | " | " | " | " |
| 7 | " | " | 30 | 70(P) | " | " | " | " | 100/25 | " | 2 |
| 8 | " | " | " | " | " | " | " | " | " | " | " |
| 9 | " | " | " | " | " | " | " | " | " | " | " |
| 10 | " | " | 100 | 0(P) | " | " | Block | " | " | " | 23 |
| 11 | " | " | " | " | " | " | " | " | " | " | " |
| 12 | " | " | " | " | " | " | " | " | " | " | " |
| 13 | Glycerine | 3 | 80 | 20(P) | 6000 | " | Random | " | 100/30 | " | 8 |
| 14 | " | " | 60 | 40(P) | " | " | " | " | " | " | 7 |
| 15 | " | " | 40 | 60(P) | " | " | " | " | " | " | 5 |
| 16 | " | " | 20 | 80(P) | " | " | " | " | " | " | 4 |
| 17 | " | " | 80 | 20(P) | " | " | Block | " | " | " | 15 |
| 18 | " | " | 60 | 40(P) | " | " | " | " | " | " | 13 |
| 19 | " | " | 40 | 60(P) | " | " | " | " | " | " | 12 |
| 20 | " | " | 20 | 80(P) | " | " | " | " | " | " | 10 |
| 21 | " | " | 100 | 0(P) | " | " | " | " | " | " | 20 |
| 22 | " | " | 80 | 20(P) | 2000 | 666.7 | Random | " | 100/25 | " | 4 |
| 23 | " | " | " | " | " | " | Block | " | " | " | 8 |
| 24 | Sorbitol | 6 | " | " | 12000 | 2000 | Random | " | 100/30 | " | 5 |
| 25 | " | " | 60 | 40(P) | " | " | " | " | " | " | 3 |
| 26 | " | " | 40 | 60(P) | " | " | " | " | " | " | 2 |
| 27 | " | " | 80 | 20(P) | " | " | Block | " | " | " | 21 |
| 28 | " | " | 60 | 40(P) | " | " | " | " | " | " | 18 |
| 29 | " | " | 40 | 60(P) | " | " | " | " | " | " | 15 |
| 30 | " | " | 80 | 20(P) | 4000 | 666.7 | " | " | " | " | 10 |
| 31 | " | " | 100 | 0(P) | " | " | " | " | " | " | 13 |
| 32 | " | " | 80 | 20(P) | " | " | Random | " | " | " | 5 |
| 33 | Ethylene glycol | 2 | " | 20(B) | " | 2000 | " | " | " | " | 5 |
| 34 | " | " | 60 | 40(B) | " | " | " | " | " | " | 2 |
| 35 | " | " | 40 | 60(B) | " | " | " | " | " | " | 0 |
| 36 | " | " | 80 | 20(S) | 8000 | 4000 | " | " | 100/25 | " | 15 |
| 37 | " | " | 60 | 40(S) | " | " | " | " | " | " | 10 |
| 38 | " | " | 40 | 60(S) | " | " | " | " | " | " | 3 |
| 39 | " | " | 60 | 40(B) | 4000 | 2000 | Block | " | 100/30 | " | 10 |
| 40 | " | " | 60 | 40(S) | 12000 | 6000 | " | " | 100/25 | " | 20 |
| 41 | Glycerine | 3 | 80 | 20(B) | 6000 | 2000 | Random | " | 100/30 | " | 6 |
| 42 | " | " | 60 | 40(B) | " | " | " | " | " | " | 3 |
| 43 | " | " | 40 | 60(B) | " | " | " | " | " | " | 0 |
| 44 | " | " | 80 | 20(B) | 1000 | 333.3 | " | " | 100/25 | " | −5 |
| 45 | " | " | 60 | 40(B) | " | " | " | " | " | " | −1 |
| 46 | " | " | 40 | 60(B) | " | " | " | " | " | " | 0 |

Table 1-continued

| | | | | | | | | | | |
|---|---|---|---|---|---|---|---|---|---|---|
| | | | colspan="4" | Properties of Polyethers | colspan="3" | Preparation of Prepolymers | | | |
| | colspan="2" | Starting materials | colspan="2" | Added alkylene oxide | | Type of polymeri- | | Ratio of polyether/ polyisocya- | colspan="2" | Prepolymers |
| Sample No. | Poly-alcohols | OH groups | Ethylene oxide (wt. %) | Other alkylene oxide | Avg. Mol. wt. in total | Avg. Mol. wt. per —OH | zation | Isocya-nates | nate by weight | Appearance | Solid-ifying point (° C) |

| Sample No. | Poly-alcohols | OH groups | Ethylene oxide (wt. %) | Other alkylene oxide | Avg. Mol. wt. in total | Avg. Mol. wt. per —OH | Type of polymerization | Isocyanates | Ratio of polyether/polyisocyanate by weight | Appearance | Solidifying point (° C) |
|---|---|---|---|---|---|---|---|---|---|---|---|
| 47 | " | " | 80 | 20(S) | 6000 | 2000 | " | " | " | " | 12 |
| 48 | " | " | 60 | 40(S) | " | " | " | " | " | " | 8 |
| 49 | " | " | 40 | 60(S) | " | " | " | " | " | " | 0 |
| 50 | " | " | 80 | 20(S) | " | " | Block | " | " | " | 20 |
| 51 | " | " | 60 | 40(S) | " | " | " | " | " | " | 13 |
| 52 | " | " | 40 | 60(S) | " | " | " | " | " | " | 5 |
| 53 | Sorbitol | 6 | 80 | 20(S) | 12000 | 2000 | Random | " | 100/30 | " | 1 |
| 54 | " | " | 60 | 40(S) | " | " | " | " | " | " | −1 |
| 55 | " | " | 40 | 60(S) | " | " | " | " | " | " | −3 |
| 56 | " | " | 80 | 20(S) | " | " | " | TDI-80:MDI =80:20 | 100/25 | " | −5 |
| 57 | " | " | 60 | 40(S) | " | " | " | " | " | " | 3 |
| 58 | " | " | 40 | 60(S) | " | " | " | " | " | " | 1 |
| 59 | " | " | 80 | 20(B) | " | " | " | TDI-80 | " | " | 13 |
| 60 | " | " | 60 | 40(B) | " | " | " | " | " | " | 10 |
| 61 | " | " | 40 | 60(B) | " | " | " | " | " | " | 7 |
| 62 | " | " | 60 | 40(B) | " | " | Block | " | " | " | 15 |
| 63 | Ethylene glycol | 2 | 80 | 20(P) | 1600 | 800 | Random | " | " | " | 0 |
| 64 | " | " | " | " | 2000 | 1000 | " | " | " | " | 2 |
| 65 | " | " | " | " | 8000 | 4000 | " | " | " | " | 6 |
| 66 | " | " | " | " | 10000 | 5000 | " | " | " | " | 10 |
| 67 | Glycerine | 3 | " | " | 2100 | 700 | " | " | " | " | −2 |
| 68 | " | " | " | " | 3500 | 1170 | " | " | " | " | 0 |
| 69 | " | " | " | " | 12000 | 4000 | " | " | " | " | 4 |
| 70 | " | " | " | " | 15000 | 5000 | " | " | " | " | 12 |
| 71 | Sorbitol | 6 | " | " | 6000 | 1000 | " | " | " | " | 0 |
| 72 | " | " | " | " | 24000 | 4000 | " | " | " | " | 5 |
| 73 | " | " | " | " | 30000 | 5000 | " | " | " | " | 9 |
| 74 | Ethylene glycol | 2 | 100 | 0(P) | 2000 | 1000 | " | " | " | " | −1 |
| 75 | " | " | 0 | 100(P) | " | " | " | " | " | " | −15 |
| 76 | Glycerine | 3 | 100 | 0(P) | 3000 | 1000 | " | " | " | " | 0 |
| 77 | " | " | 0 | 100(P) | " | " | " | " | " | " | −30 |
| 78 | " | " | 80 | 20(P) | 10500 | 3500 | " | " | 100/30 | " | 8 |
| 79 | " | " | " | " | 9000 | 3000 | " | " | " | " | 7 |
| 80 | " | " | " | " | 3000 | 1000 | " | " | " | " | 4 |
| 81 | Sorbitol | 6 | " | " | 18000 | 3000 | " | " | " | " | 5 |
| 82 | " | " | " | " | 12000 | 2000 | " | " | " | " | " |

(P): Propylene oxide
(S): Styrene oxide
(B): Butylene oxide
TDI-80: Tolylene diisocyanate, 80/20 2,4–2,6 isomer
MDI: 4,4'-diphenyl methane diisocyanate Table 2

Formation of Polyurethane Hydrogel with water

| Prepolymer Sample No. | Prepolymer (wt.%) | State | Gel Hardness (JIS-K-2809) | Separation of water | Acceptability of Products |
|---|---|---|---|---|---|
| 1 | 5 | Soft gel | 250 | Not found | Good |
| 2 | 10 | Highly elastic gel | 160 | " | " |
| 3 | 20 | Elastic foamed gel | 120 | " | " |
| 4 | 5 | Soft gel | 300 | " | " |
| 5 | 10 | Highly elastic gel | 180 | " | " |
| 6 | 20 | Elastic foamed gel | 140 | " | " |
| 7 | 5 | Non-uniform gel | — | Found | No good |
| 8 | 10 | Soft gel | 400 | " | " |
| 9 | 20 | Elastic gel | 190 | " | " |
| 10 | 5 | Soft gel | 380 | " | " |
| 11 | 10 | Highly elastic gel | 180 | " | " |
| 12 | 20 | " | 150 | Not found | " |
| 13 | 5 | Soft gel | 250 | " | Good |
| 14 | " | " | 260 | " | " |
| 15 | " | " | 400 | Found | No good |
| 16 | " | Non-uniform gel | — | " | " |
| 17 | " | Soft gel | 450 | " | " |
| 18 | " | " | 420 | " | " |
| 19 | " | Non-uniform gel | — | " | " |
| 20 | " | " | — | " | " |
| 21 | " | Soft gel | 400 | " | " |
| 22 | " | Non-uniform gel | — | " | " |
| 23 | " | " | — | " | " |
| 24 | " | Elastic gel | 200 | Not found | Good |
| 25 | " | " | 205 | " | " |
| 26 | " | Non-uniform gel | — | Found | No good |
| 27 | " | " | — | " | " |
| 28 | " | " | — | " | " |
| 29 | " | " | — | " | " |
| 30 | " | " | — | " | " |

Table 2-continued

Formation of Polyurethane Hydrogel with water

| Prepolymer Sample No. | Prepolymer (wt.%) | Hydrogel State | Gel Hardness (JIS-K-2809) | Separation of water | Acceptability of Products |
|---|---|---|---|---|---|
| 31 | " | " | — | " | " |
| 32 | " | " | — | " | " |
| 33 | " | Soft gel | 220 | Not found | Good |
| 34 | " | " | 300 | " | " |
| 35 | " | Non-uniform gel | — | Found | No good |
| 36 | " | Soft gel | 340 | Not found | Good |
| 37 | 10 | " | 300 | " | " |
| 38 | " | Non-uniform gel | — | Found | No good |
| 39 | 5 | " | — | " | " |
| 40 | " | " | — | " | " |
| 41 | " | Soft gel | 260 | Not found | Good |
| 42 | " | " | 280 | " | " |
| 43 | " | Non-uniform gel | — | Found | No good |
| 44 | " | " | — | " | " |
| 45 | " | " | — | " | " |
| 46 | " | " | — | " | " |
| 47 | " | Soft gel | 290 | Not found | Good |
| 48 | " | " | 330 | " | " |
| 49 | " | Non-uniform gel | — | Found | No good |
| 50 | " | " | — | " | " |
| 51 | " | " | — | " | " |
| 52 | " | " | — | " | " |
| 53 | " | Elastic gel | 180 | Not found | Good |
| 54 | " | " | 200 | " | " |
| 55 | " | Non-uniform gel | — | Found | No good |
| 56 | " | Elastic gel | 120 | Not found | Good |
| 57 | " | " | 150 | " | " |
| 58 | " | Non-uniform gel | — | Found | No good |
| 59 | " | Elastic gel | 190 | Not found | Good |
| 60 | " | " | 230 | " | " |
| 61 | " | Non-uniform gel | — | Found | No good |
| 62 | " | " | — | " | " |
| 63 | " | " | — | " | " |
| 64 | " | Soft gel | 300 | Not found | Good |
| 65 | " | " | 350 | " | " |
| 66 | " | Non-uniform gel | — | Found | No good |
| 67 | " | " | — | " | " |
| 68 | " | Soft gel | 300 | Not found | Good |
| 69 | " | Elastic gel | 150 | " | " |
| 70 | " | Non-uniform gel | — | Found | No good |
| 71 | " | Elastic gel | 120 | Not found | Good |
| 72 | " | " | 150 | " | " |
| 73 | " | Non-uniform gel | — | Found | No good |
| 74 | " | " | — | " | " |
| 75 | " | No gel formation | — | — | " |
| 76 | " | Non-uniform gel | — | Found | " |
| 77 | " | No gel formation | — | — | " |
| 78 | " | Elastic, partly gelated | 180 | Found | " |
| 79 | " | Soft, uniformly gelated | 290 | Not found | Good |
| 80 | " | Elastic, partly gelated | — | Found | No good |
| 81 | " | Elastic gel | 150 | Not found | Good |
| 82 | " | Elastic, partly gelated | 200 | Found | No good |

Table 3

Formation of Polyurethane Hydrogel with Sea Water

| Prepolymer Sample No. | Prepolymer (wt.%) | Hydrogel State | Gel Hardness (JIS-K-2809) | Separation of water | Temperature at gel formation (° C) | Acceptability of Products |
|---|---|---|---|---|---|---|
| 1 | 5 | Elastic, partly gelated | 220 | Found | 20 | No good |
| " | 10 | " | 200 | " | " | " |
| " | 20 | Highly elastic, uniformly gelated | 80 | " | " | " |
| " | 5 | Elastic, partly gelated | 80 | " | 36 | " |
| " | 10 | " | 50 | " | " | " |
| " | 20 | " | — | " | " | " |
| 13 | 5 | Soft, uniformly gelated | 280 | Not found | 20 | Good |
| " | 10 | Highly elastic, uniformly gelated | 120 | " | " | " |
| " | 20 | " | 80 | " | " | " |
| 80 | 5 | Elastic, partly gelated | 200 | Found | " | No good |
| " | 10 | " | 140 | " | " | " |
| " | 20 | " | 100 | " | " | " |
| 78 | 5 | " | 180 | " | " | " |
| " | 10 | " | 120 | " | " | " |
| " | 20 | " | 80 | " | " | " |
| 79 | 5 | Elastic, uniformly gelated | 290 | Not found | " | Good |

Table 3-continued
Formation of Polyurethane Hydrogel with Sea Water

| Prepolymer Sample No. | Prepolymer (wt.%) | State | Gel Hardness (JIS-K-2809) | Separation of water | Temperature at gel formation (°C) | Acceptability of Products |
|---|---|---|---|---|---|---|
| " | 10 | Highly, elastic uniformly gelated | 130 | " | " | " |
| " | 20 | " | 90 | " | " | " |
| " | 10 | " | 170 | " | 36 | " |
| " | 20 | " | 90 | " | " | " |
| 14 | 5 | Soft, uniformly gelated | 280 | " | 20 | " |
| 15 | " | Non-uniform gel | — | Found | " | No good |
| 16 | " | " | — | " | " | " |
| 13 | " | Elastic, uniformly gelated | 290 | Not found | " | Good |
| 14 | " | " | 300 | " | " | " |
| 15 | " | Non-uniform gel | — | Found | " | No good |
| 80 | " | " | — | " | " | " |
| " | " | " | — | " | " | " |
| 72 | " | Elastic, partly gelated | 180 | " | " | " |
| 82 | " | " | 200 | " | " | " |
| 81 | " | Elastic gel | 150 | Not found | " | Good |

Table 4
Formation of Polyurethane Hydrogel with Aqueous Electrolyte Solution

| Prepolymer Sample No. | Electrolyte solution | pH | Prepolymer (wt.%) | State | Gel Hardness (JIS-K-2809) | Separation of water | Temperature at gel formation (°C) | Acceptability of Products |
|---|---|---|---|---|---|---|---|---|
| 13 | (a) | 10.07 | 5 | Elastic, uniformly gelated | 170 | Not found | 20 | Good |
| " | " | " | " | " | 190 | " | 36 | " |
| 68 | " | " | " | Elastic, partly gelated | — | Found | 20 | No good |
| " | " | " | " | " | — | " | 36 | " |
| 1 | " | " | " | " | — | " | 20 | " |
| " | " | " | " | " | — | " | 36 | " |
| 78 | " | " | " | " | — | " | 20 | " |
| " | " | " | " | " | — | " | 36 | " |
| 79 | " | " | " | Elastic, uniformly gelated | 150 | Not found | 20 | Good |
| " | " | " | " | " | 140 | " | 36 | " |
| 13 | (b) | 6.88 | " | " | 190 | " | 20 | " |
| " | " | " | " | " | 240 | " | 36 | " |
| 80 | " | " | " | Elastic, partly gelated | — | Found | 20 | No good |
| " | " | " | " | " | — | " | 36 | " |
| 1 | " | " | " | No gel formation | — | " | 20 | " |
| " | " | " | " | " | — | " | 36 | " |
| 78 | " | " | " | Elastic, partly gelated | — | " | 20 | " |
| " | " | " | " | " | — | " | 36 | " |
| 79 | " | " | " | Elastic, uniformly gelated | 150 | Not found | 20 | Good |
| " | " | " | " | " | 140 | " | 36 | " |
| 13 | (c) | 4.02 | " | " | 280 | " | 20 | " |
| " | " | " | " | " | 270 | " | 36 | " |
| 79 | " | " | " | " | 240 | " | 20 | " |
| " | " | " | " | " | 220 | " | 36 | " |
| 80 | " | " | " | Elastic, partly gelated | — | Found | 20 | No good |
| " | " | " | " | " | — | " | 36 | " |
| 1 | " | " | " | Soft, partly gelated | — | " | 20 | " |
| " | " | " | " | " | — | " | 36 | " |
| 13 | (d) | 1.69 | 15 | Elastic, uniformly gelated | 280 | Not found | 20 | Good |
| " | " | " | " | " | 270 | " | 36 | " |
| 79 | " | " | " | " | 260 | " | 20 | " |
| " | " | " | " | " | 250 | " | 36 | " |
| 78 | " | " | " | Elastic, partly gelated | — | Found | 20 | No good |
| " | " | " | " | " | — | " | 36 | " |
| 1 | " | " | " | Non-uniform gel | — | " | 20 | " |
| " | " | " | " | " | — | " | 36 | " |
| 80 | " | " | " | Elastic, partly gelated | — | " | 20 | No good |

(a): Standard aqueous solution containing sodium carbonates
(b): Standard aqueous solution containing neutral phosphates
(c): Standard aqueous phthalate solution
(d): Standard aqueous oxalate solution

Table 5
Chemical Resistance Tests of Polyurethane Hydrogels

| Hydrogels | Chemicals | No treatment | After 15 days' dipping treatment | After 30 days' dipping treatment |
|---|---|---|---|---|
| A | $H_2SO_4$ soln. (pH 1.0) | Elastic gel | Elastic gel | Elastic gel |
|   | $Na_2SO_4$ soln.(pH 7.0) | " | " | " |
|   | $Ca(OH)_2$ soln.(pH 11.0) | " | Partially resolved | Completely resolved |
|   | NaOH soln. (pH 13.0) | " | Elastic gel | Partially resolved |
| B | $H_2SO_4$ soln. (pH 1.0) | Elastic gel | Elastic gel | Elastic gel |
|   | $Na_2SO_4$ soln.(pH 7.0) | " | " | " |
|   | $Ca(OH)_2$ soln.(pH 11.0) | " | " | " |
|   | NaOH soln. (pH 13.0) | " | " | " |

A: 20% by weight of the prepolymer of Sample 1 was dispersed in 80% by weight of tap water.
B: 20% by weight of the prepolymer of Sample 13 was dispersed in 80% by weight of tap water.

What is claimed is:

1. A polyurethane hydrogel obtained by dispersing:
(a) a reaction product obtained by the reaction of polyisocyanate having at least two isocyanate groups with a polyether into
(b) an aqueous liquid phase;
wherein the amounts of said (a) and (b) are such that the hydrogel product has a water content of 70 to 95% by weight and wherein said polyether is produced from a plurality of alkylene oxides, 75 to 85% by weight of which is ethylene oxide, added at random to a polyalcohol having at least two terminal hydroxyl groups in an amount to produce an average molecular weight of 2000 to 3000 per said terminal hydroxyl group of said polyalcohol.

2. The polyurethane hydrogel of claim 1, wherein said polyalcohol is ethylene glycol.

3. The polyurethane hydrogel of claim 1, wherein said polyalcohol has three terminal hydroxyl groups.

4. The polyurethane hydrogel of claim 3, wherein said polyalcohol is glycerine.

5. A polyurethane hydrogel as defined in claim 1, in which said polyether comprises ethylene oxide and propylene oxide added at random to glycerine in an amount of an average molecular weight within the range of 2,000 to 3,000 per terminal hydroxyl group of said glycerine, said ethylene oxide and propylene oxide being contained in said polyether at the ratio within the range of 75:25 to 85:15 by weight, respectively.

6. The polyurethane hydrogel of claim 1, wherein said polyalcohol is sorbitol.

7. The polyurethane hydrogel of claim 1, wherein the polyisocyanate is reacted with the polyether in an NCO/OH ratio of at least about 3.

8. A polyurethane hydrogel as defined in claim 1, in which said aqueous liquid phase is water or an aqueous solution or dispersion.

9. A polyurethane hydrogel as defined in claim 4, in which said aqueous liquid phase is sea water.

10. The polyurethane hydrogel of claim 4, wherein the aqueous phase is a solution of a carbonate, phosphate, oxalate or phthalate.

11. A method for the production of a polyurethane hydrogel comprising dispersing:
(a) a reaction product obtained by the reaction of polyisocyanate having at least two isocyanate groups with a polyether, into
(b) an aqueous liquid phase to form a hydrogel;
wherein the amounts of said (a) and (b) are such that the hydrogel product has a water content of 70 to 95% by weight and wherein said polyether is produced from a plurality of alkylene oxides, 75 to 85% by weight of which is ethylene oxide, added at random to a polyalcohol having at least two terminal hydroxyl group in an amount to produce an average molecular weight of 2000 to 3000 per said terminal hydroxyl group of said polyalcohol.

12. The method of claim 11, wherein said polyalcohol is ethylene glycol.

13. The method of claim 11, wherein said polyalcohol has three terminal hydroxyl groups.

14. The method of claim 13, wherein said polyalcohol is glycerine.

15. A method for the production of polyurethane hydrogel as defined in claim 11, in which polyether comprises ethylene oxide and propylene oxide added at random to glycerine in an average molecular weight within the range of 2,000 to 3,000 per terminal hydroxyl group of said glycerine, said ethylene oxide and propylene oxide being contained in said polyether at the ratio within the range of 75:25 to 85:15 by weight, respectively.

16. The method of claim 11, wherein said polyalcohol is sorbitol.

17. The method of claim 11, wherein the polyisocyanate is reacted with the polyether in an NCO/OH ratio of at least about 3.

18. A method for the production of a polyurethane hydrogel as defined in claim 11, in which said aqueous liquid phase is water or an aqueous solution or dispersion.

19. A method for the production of polyurethane hydrogel as defined in claim 14, in which aqueous liquid phase is sea water.

20. The method of claim 14, wherein the aqueous liquid phase is a solution of a carbonate, phosphate, oxalate or phthalate.

* * * * *